(12) United States Patent
Schneider et al.

(10) Patent No.: US 8,418,568 B2
(45) Date of Patent: Apr. 16, 2013

(54) BELT TEST APPARATUS

(75) Inventors: Dean Schneider, Washington, MI (US); Alexander Serkh, Troy, MI (US); Imtiaz Ali, Lathrup Village, MI (US); Peter Ward, Farmington Hills, MI (US)

(73) Assignee: The Gates Corporation, Denver, CO (US)

( * ) Notice: Subject to any disclaimer, the term of this patent is extended or adjusted under 35 U.S.C. 154(b) by 302 days.

(21) Appl. No.: 13/039,355

(22) Filed: Mar. 3, 2011

(65) Prior Publication Data

US 2012/0222497 A1    Sep. 6, 2012

(51) Int. Cl.
*G01L 3/02* (2006.01)
*G01L 3/00* (2006.01)

(52) U.S. Cl.
USPC .............. 73/862.194; 73/862.08; 196/3.56; 196/0.076

(58) Field of Classification Search ............ 73/862.194, 73/862.08
See application file for complete search history.

(56) References Cited

U.S. PATENT DOCUMENTS 3,956,929 A * 5/1976 Jenkins et al. ............... 73/7
4,237,719 A * 12/1980 Takano ..................... 73/7
4,606,446 A * 8/1986 Watanabe .................. 477/39

\* cited by examiner

*Primary Examiner* — Freddie Kirkland, III
*Assistant Examiner* — Jamel Williams
(74) *Attorney, Agent, or Firm* — J. A. Thurnau, Esq.; P. N. Dunlap, Esq.

(57) ABSTRACT

A flexible member test apparatus comprising a driver member having a first diameter and a second diameter, the first diameter is not equal to the second diameter, a first driven member coupled by a first flexible member to the driver member through contact of the first flexible member with a first diameter surface, a second driven member coupled by a second flexible member to the driver member through contact of the second flexible member with a second diameter surface, the first driven member rotationally coupled to a magnetic particle clutch, and the second driven member rotationally coupled to the magnetic particle clutch.

10 Claims, 1 Drawing Sheet

US 8,418,568 B2

BELT TEST APPARATUS

FIELD OF THE INVENTION

The invention relates to a belt test apparatus, and more particularly to a belt test apparatus having a magnetic particle clutch selectively engagable such that a differential belt speed provides for energy recovery during testing of at least two belts.

BACKGROUND OF THE INVENTION

The invention relates to measuring and testing torque using a rotating torque responsive element, but more particularly, the invention relates to apparatus for dynamically testing power transmission belts.

Four-square testing apparatus is used to determine the dynamic effect of horsepower and torque on power transmission components. In such apparatus, power is recirculated between two rotating shafts. The advantage of such drives is that input power is quite small compared to the power absorbed in the recirculating system. The input power need make up only for power losses of the system.

Preload torque in known quantity is easily introduced in apparatus where the shafts are mechanically interlocked with positive rotational devices such as gears. Starting with parallel shafts mechanically interconnected with spur gears, one shaft may be rotationally displaced from the other to preload a known torque in the two shafts. Rotation of either shaft by external means causes the preload torque to be dynamically recirculated between the two rotating shafts. While such apparatus is satisfactory for testing power transmission components where the shafts are mechanically interlocked, the apparatus is unsatisfactory for testing power transmission components where mechanical interlocking of the two shafts cannot be obtained. The apparatus is unsatisfactory for testing components which transmit power by means of friction. This is because the statically introduced torque is easily lost at the friction surfaces, leaving no preload for power recirculation.

In a type of four-square apparatus, it is known to have two parallel shafts with two pulleys of different diameters mounted on each shaft. The pulleys are arranged so the large pulley of one shaft is aligned with the smaller pulley of the other shaft. The difference in pulley diameters is chosen for a predetermined speed ratio. Two V-belts are arranged over the pulleys and preloaded. One shaft is rotated. The difference in speed ratio causes power to recirculate between the belts. A problem associated with such a device is that of determining the tension in each belt. This is because belts typically stretch and wear down in width during their normal service life and they are built with circumferential tolerances. While the torque between two belts could be measured, their contribution and their share of a recirculating horsepower load is indeterminate because of the unknown tensions. Also, the torque arising from a given ratio cannot be predicted ahead of time because of variations in belt transverse and longitudinal elastic characteristics.

Representative of the art is U.S. Pat. No. 3,956,929 (1976) to Jenkins et al. which discloses a testing apparatus including a fixed shaft and a floating shaft with means for moving it selectively generally parallel to the fixed shaft, two pulleys on each shaft paired and aligned between shafts and wherein one of the pulleys is the selectively variable diameter type.

What is needed is a belt test apparatus having a magnetic particle clutch selectively engagable such that a differential belt speed provides for energy recovery during testing of at least two belts. The present invention meets this need.

SUMMARY OF THE INVENTION

The primary aspect of the invention is a belt test apparatus having a magnetic particle clutch selectively engagable such that a differential belt speed provides for energy recovery during testing of at least two belts.

Other aspects of the invention will be pointed out or made obvious by the following description of the invention and the accompanying drawings.

The invention comprises a flexible member test apparatus comprising a driver member having a first diameter and a second diameter, the first diameter is not equal to the second diameter, a first driven member coupled by a first flexible member to the driver member through contact of the first flexible member with a first diameter surface, a second driven member coupled by a second flexible member to the driver member through contact of the second flexible member with a second diameter surface, the first driven member rotationally coupled to a magnetic particle clutch, and the second driven member rotationally coupled to the magnetic particle clutch.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
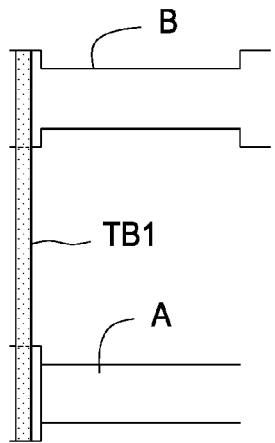
FIG. 1 is a side view of a prior art test rig.
Figure 2:
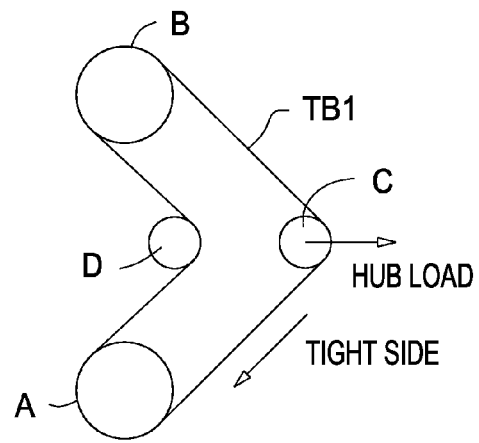
FIG. 2 is a front view of the test rig in FIG. 1.

FIG. 1 is a side view of a prior art test rig. FIG. 2 is a front view of the test rig in FIG. 1. This invention pertains to a test rig for continuous durability testing of flexible drive members, specifically belts and chains. Known test rigs load the test belt TB1 through the use of a waterbrake B. Waterbrake B applies torque load to the belt TB1 by converting rotational energy into heat inside the waterbrake as is known in the art. The heat is carried away in the water flowing through the water break.

Driver shaft A drives a waterbrake B through a test belt TB1 which spans between shaft A and waterbreak B. A preload tension is applied to test belt TB1 by use of a tensioner C and idler pulley D, each known in the art. Tensioner C applies a spring force to belt TB1 thereby applying a tensile load to the belt. Shaft A is shown as rotating clockwise.

Figure 3:
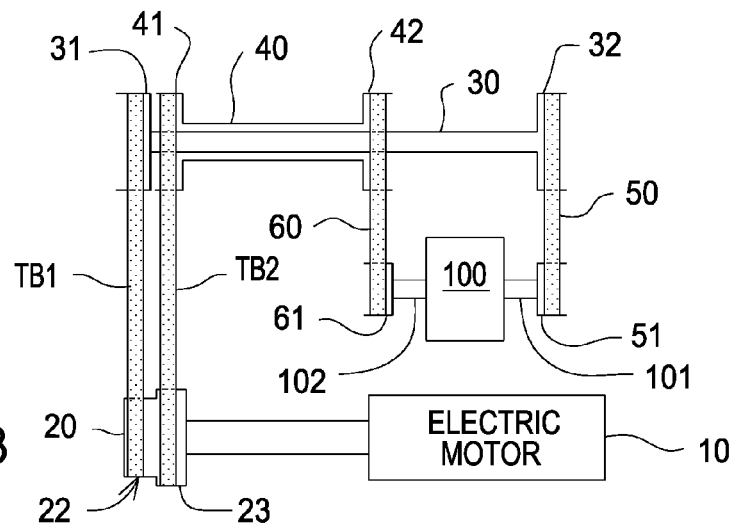
FIG. 3 is a side view of the inventive test apparatus.
Figure 4:
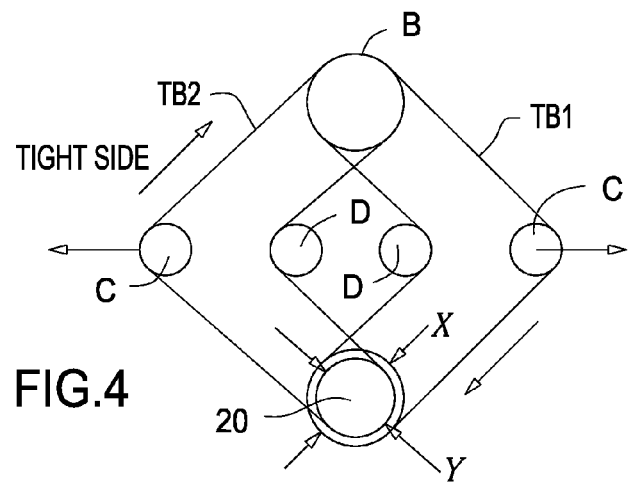
FIG. 4 is a front view of the test apparatus in FIG. 3.

FIG. 3 is a side view of the inventive test apparatus. FIG. 4 is a front view of the test apparatus in FIG. 3. The inventive apparatus comprises replacing the waterbrake with a magnetic particle clutch 100. The apparatus operates by recirculating the torque output of the clutch 100 back into a second test belt TB2 which then feeds the torque back into the main drive thus recovering previously lost energy.

A prior art test configuration consists of only the right hand side of the apparatus shown in FIG. 4. The belt TB1 is tested with the basic test condition requirement being 20.3 Nm torque load at 4900 rpm. Energy analysis of this test indicates that 10.4 Kw of energy would be converted to waste heat in a waterbrake. This is simply the energy in the test belt drive and ignores other inefficiencies in the system such as electric motor efficiency.

$$Power(watts) = Rpm*(2\pi/60)*Torque$$

$$P = 4900*(2\pi/60)*20.3 \text{ Nm}$$

$$P = 10.4 \text{ Kw}$$

The tension in the belt due to the 20.3 Nm torque load applied by the waterbrake in FIG. 2 is 336.5 N.

The apparatus comprises a driver shaft 20. Driver shaft 20 is engaged with a first driven shaft 30 by a test belt TB1 through a pulley 31. Driver shaft 20 is also engaged with a second driven shaft 40 by a test belt TB2 through a pulley 41. A belt 50 connects first driven shaft 30 with the input shaft of the magnetic particle clutch 100 through a pulley 51. A belt 60 connects the second driven shaft 40 to the output shaft of the magnetic particle clutch 100 through a pulley 61.

An electric motor 10 drives the driven shaft 20. Instead of using a belt 50, first driven shaft 30 may also be connected to the input shaft 101 of the magnetic particle clutch using a chain, toothed belt or gears with equal success. Instead of using a belt 60, second driven shaft 40 may also be connected to the input shaft 102 of the magnetic particle clutch using a chain, toothed belt or gears with equal success.

The pulleys are arranged in corresponding pairs such that pulley 31 matches pulley 41, and pulley 42 matches pulley 32, and pulley 51 matches pulley 61, and pulley 22 matches pulley 21. A pulley 21 is attached to the end of shaft 20. Pulley 21 has two belt engaging surfaces. The first belt engaging surface 23 has a diameter X and is in contact with test belt TB2. The second belt engaging surface 22 has a diameter Y=0.98X and is in contact with test belt TB1. The reason for the difference in diameters is so the absolute belt speed will be different for each test belt, which is desired because this results in a speed differential across the clutch 100 which is necessary for generating the tensile load in the second test belt. Namely, the first input shaft 101 rotates at a speed different that the rotation speed of input shaft 102. This effect can also be achieved by making the diameter of any one of the pulleys different from the diameter of its corresponding matched pair pulley in the system, regardless of the position of the pulley in the system chosen to have the different diameter. Hence, any pulley entrained with the first flexible member having a diameter different from a pulley that is entrained with the second flexible member will cause the clutch first input shaft 101 to rotate at a speed different than a rotation speed for the clutch second input shaft 102. Pulley 31 can have a diameter that is different from the diameter of pulley 41, for example, pulley 31 will have a diameter Y=0.98X while the matched pair pulley 41 will have the diameter X.

A tensioner C and idler pulley D are used in each of the two test belt circuits. Force vector analysis of the inventive apparatus shows the same tension force within each test belt, that is each test belt is subjected to a tensile force of 336.5 N.

The torque required to rotate the apparatus is the sum of the torque required to rotate test belt 1 less the torque recovered through the particle clutch and the second test belt drive.

$$T = (\text{torque required to rotate test belt } \mathbf{1}) - (\text{torque to rotate test belt } \mathbf{2})$$

$$T = (336.5*0.06032) - (336.5*0.05912)$$

$$T = 0.4 \text{ Nm}$$

Energy analysis of this configuration shows that it requires 0.2 Kw of power be converted to heat within the particle brake.

$$P = Power$$

$$P = 4900*(2\pi/60)*0.4 \text{ Nm}$$

$$P = 0.2 \text{ Kw}$$

Energy analysis of the particle brake shows that the heat generation is 0.2 Kw which matches the energy analysis of the drive.

Heat Generated in particle clutch $$Power(watts) = \Delta Rpm*(2\pi/60)*Torque$$

$$P = 33*(2\pi/60)*60.9 \text{ Nm}$$

$$P = 0.2 \text{ Kw}$$

Particle clutch 100 is known in the art, for example, a magnetic particle clutch model POC-400 by Placid Industries, Lake Placid, N.Y., US. A "constant-current" D.C. power supply is used to assure the best accuracy in open-loop control systems. With no electrical excitation, the input shaft and output shaft of the clutch freely rotate. With electrical excitation, the input shaft becomes coupled to the output shaft. Torque is proportional to input current, and independent of slip RPM. While the load torque is less than the output torque, the clutch drives without slip. When the load torque is increased, the clutch will slip smoothly at the torque level set by the coil input current. The clutch can transmit up to 400 Nm.

Although the preferred embodiment relates to a magnetic particle clutch, any slip clutch where torque can be controlled or set will work with equal success. Hence, mechanical clutches are available wherein the slip torque can be mechanically set to a desired value and the clutch will slip when that torque value is exceeded thus providing the same effect obtained from the magnetic particle clutch, collectively a "slip clutch". For example, a permanent magnet clutche by PrecisionTork™, model MC1.5; a Polyclutch™ Slip-Aire™ pneumatic slip clutch or a continuous slip mechanical clutch; a Dynaspede™ magnetic particle clutch; a Boston Gear™ electrical clutch, model CB. The foregoing are offered by way of example and not of limitation.

Since the inventive configuration includes a second test belt TB2, the number of belts tested is doubled thus further improving efficiency.

This invention allows the recovery of lost energy by doubling test belt throughput. It also allows test conditions to have variable conditions because the torque load in the magnetic particle clutch is variable and the speed required for torque loading is variable as well. ON the other hand, waterbrakes typically require high RPM's to function properly.

Although a form of the invention has been described herein, it will be obvious to those skilled in the art that variations may be made in the construction and relation of parts without departing from the spirit and scope of the invention described herein.

We claim:

1. A flexible member test apparatus comprising:
   a driver member having a first diameter and a second diameter, the first diameter is not equal to the second diameter;
   a first driven member coupled by a first flexible member to the driver member through contact of the first flexible member with a first diameter surface;

a second driven member coupled by a second flexible member to the driver member through contact of the second flexible member with a second diameter surface;

the first driven member rotationally coupled to a magnetic particle clutch; and the second driven member rotationally coupled to the magnetic particle clutch.

2. The flexible member test apparatus as in claim 1, wherein the first diameter is approximately 0.98 times the second diameter.

3. The flexible member test apparatus as in claim 1, wherein the first driven member and the second driven member are coaxial.

4. The flexible member test apparatus as in claim 1, wherein the magnetic particle clutch torque is proportional to an input current and is independent of a slip RPM.

5. A flexible member test apparatus comprising:

a driver member;

a first driven member coupled by a first flexible member to the driver member;

a second driven member coupled by a second flexible member to the driver member;

the first driven member rotationally coupled to a magnetic particle clutch first input shaft;

the second driven member rotationally coupled to a magnetic particle clutch second input shaft; and the magnetic particle clutch first input shaft rotated at a speed different than a rotation speed for the magnetic particle clutch second input shaft.

6. The flexible drive member test apparatus as in claim 5, wherein the first flexible member is driven as a speed not equal to the speed of the second flexible member.

7. A flexible member test apparatus comprising:

a driver member;

a first driven member coupled by a first flexible member to the driver member;

a second driven member coupled by a second flexible member to the driver member;

the first driven member rotationally coupled to a slip clutch first input shaft;

the second driven member rotationally coupled to a slip clutch second input shaft; and a first pulley entrained with the first flexible member having a diameter different from a second pulley entrained with the second flexible member wherein the slip clutch first input shaft rotates at a speed different than a rotation speed for the slip clutch second input shaft.

8. The flexible member test apparatus as in claim 7, wherein the first pulley diameter is approximately 0.98 times the second pulley diameter.

9. The flexible member test apparatus as in claim 7, wherein the first driven member and the second driven member are coaxial.

10. The flexible member test apparatus as in claim 7, wherein the slip clutch torque is proportional to an input current and is independent of a slip RPM.

\* \* \* \* \*